July 18, 1967 R. W. WILLOUGHBY 3,331,487
CONVEYOR DISCHARGE APPARATUS
Filed Feb. 1, 1966 2 Sheets-Sheet 1

INVENTOR.
Richard W. Willoughby
BY
B. B. Olive
ATTORNEY

INVENTOR.
Richard W. Willoughby
ATTORNEY

3,331,487
CONVEYOR DISCHARGE APPARATUS
Richard W. Willoughby, Sioux Falls, S. Dak., assignor to Athey Products Corporation, Raleigh, N.C., a corporation of Illinois
Filed Feb. 1, 1966, Ser. No. 524,147
4 Claims. (Cl. 198—68)

This invention relates to a conveyor discharge apparatus and, more particularly, to an apparatus for receiving, guiding and controlling the direction of flow of material discharged from the end of a belt loading material conveyor.

In the moving of earth material, for example, by means of a belt loading elevator conveyor, the earth material which is deposited on the receiving end of the elevator conveyor is transported by means of an endless conveyor belt the length of the conveyor and is then discharged into an earth moving vehicle such as a truck or the like. After each vehicle is loaded, the endless belt of the elevator conveyor must be stopped to allow an empty vehicle which is to receive the earth material to replace the loaded vehicle. The substitution of vehicles consumes a tremendous quantity of time and, consequently, the main advantage of the belt loading elevator conveyor, namely its ability to supply a continuous flow of material, is substantially eliminated.

The prior art teaches elevator conveyors which are adapted to pivot from a position of loading one vehicle into a position for loading a second vehicle but while this process reduces the lag time, it is evident that either the conveyor must be stopped or that a certain quantity of earth material will be lost during the transfer. The art would be substantially advanced if a device were provided which adapted an elevator conveyor, without requiring that it be pivoted or otherwise moved, to continuously convey earth material or the like such that it could be selectively discharged into a plurality of stationary earth moving vehicles. Therefore, an object of this invention is to provide a belt loading elevator conveyor with a discharge apparatus which is adapted to direct a continuous flow of material from the discharge end of the elevator conveyor selectively into any one of a plurality of material moving vehicles.

Another object of this invention is to provide a gravity chute-hopper with an auxiliary conveyor belt and pulley arrangement having an inverted V shape and which is adapted to utilize the force of gravity to guide the flow of material alternatively in different selected directions.

A further object of this invention is to provide a gravity chute-hopper with gates which in combination with the auxiliary conveyor belt and pulley arrangement are adapted to control the flow of falling material being discharged from the elevator conveyor so as to direct the material from a loaded vehicle into an empty vehicle.

A still further object of this invention is to provide a gravity chute-hopper having a directional discharge capacity and which may be detachably mounted onto the discharge end of a belt loading elevator conveyor.

Yet another object of this invention is to provide a reversible motor, such as electric or hydraulic, for an auxiliary conveyor belt and pulley arrangement positioned to receive material from a gravity chute-hopper which motor adapts the auxiliary conveyor belt to be driven in selected directions so as to assist the force of gravity and guide the flow of falling earth material into a selected vehicle.

Other objects and advantages of this invention will become apparent when the following detailed description is read in conjunction with the specification, claims and appended drawings. A preferred embodiment will now be described with reference to the accompanying drawings, in which:

Figure 2:
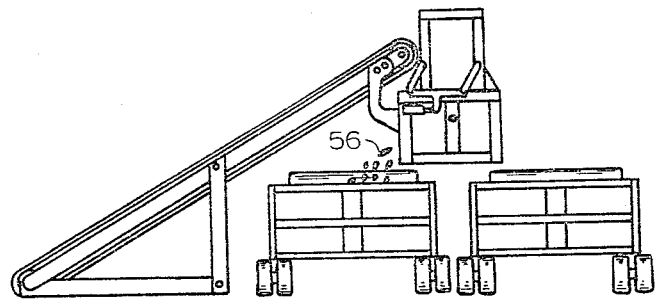
FIGURE 2 is an elevational view showing the apparatus spaced over two earth moving vehicles and directing the falling earth material into a selected vehicle.
Figure 1:
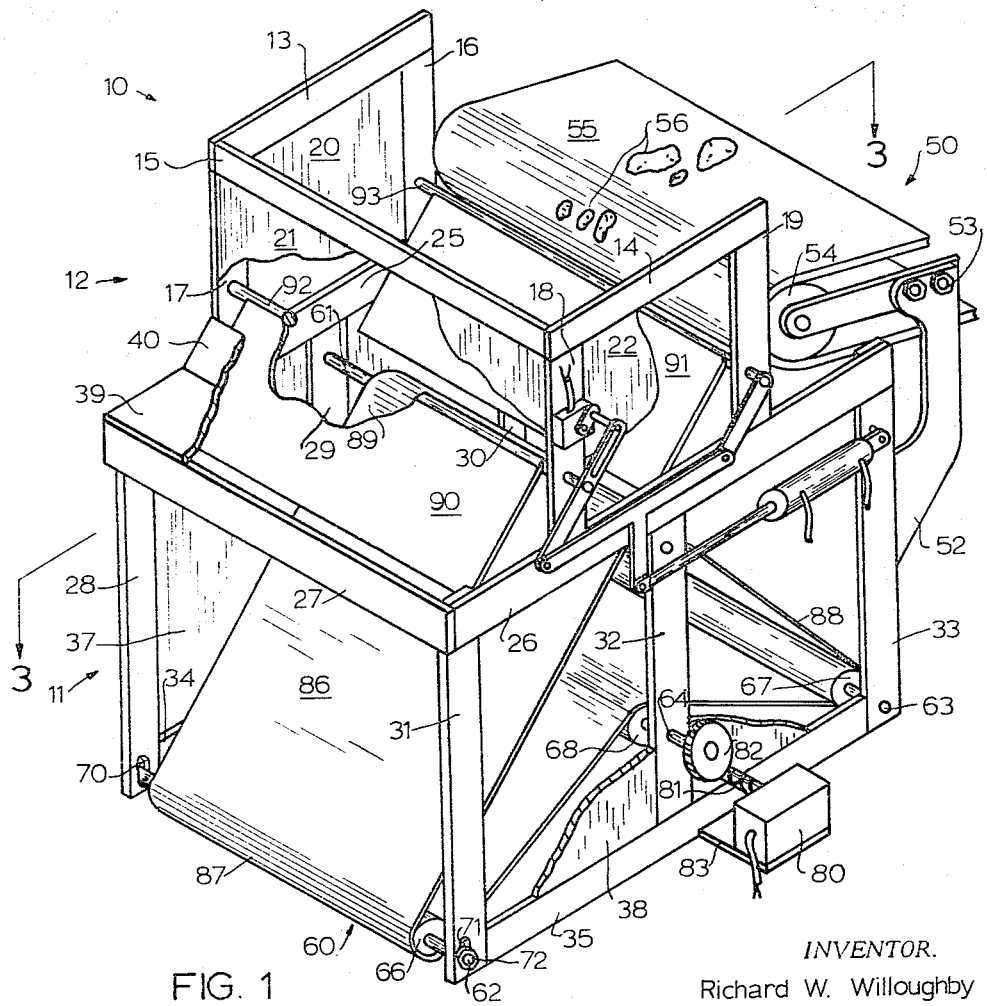
FIGURE 1 is a perspective, partial cut away view of an apparatus embodying the invention showing the interrelationships of the various components comprising the invention.
Figure 4:
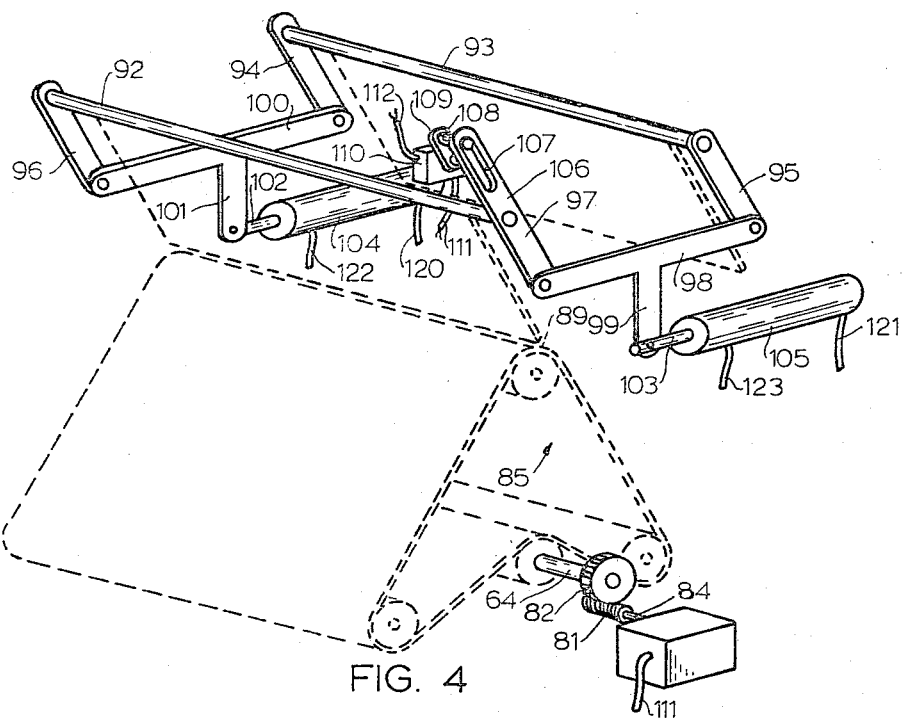
Figure 3:
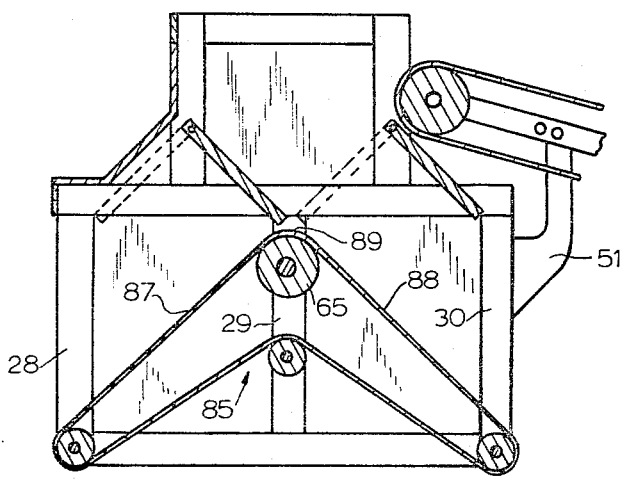

FIGURE 3 is an elevational sectional view taken along lines 3—3 of FIGURE 1 showing the gate apparatus in the reverse direction from that shown in FIGURE 1, and the auxiliary conveyor belt for directing the flow of falling earth material; and FIGURE 4 is a perspective view of the invention showing a reversible electric motor connected to and driving a pulley which is rotatably mounted in the hopper portion of the device.

A preferred embodiment of this invention contemplates detachably connecting an auxiliary gravity chute-hopper apparatus to the discharge end of a belt loading conveyor whereby the material, such as earth, falling from the discharge end of the conveyor is directed along different selected channels by the gravity chute-hopper into a selected material hauling vehicle.

The invention includes a frame which is comprised of a plurality of interconnecting support members and wall members which together define a hopper and a chute. The hopper is a box-like structure having two oppositely positioned side openings and a top opening. The chute extends upwardly from the top opening of the hopper and is bound on three sides by interconnecting wall members, the fourth side being open so as to adapt the chute to substantially straddle the discharge end of the belt loading conveyor and which is usually of the elevator type. The earth material which is discharged from the end of the elevator conveyor is directed downwardly by the chute through the top opening of the hopper where it is received by the auxiliary conveying apparatus mounted in the hopper.

The auxiliary conveying apparatus in the hopper includes a plurality of conveyor belt pulleys rotatably mounted in the support members of the hopper and which are selectively spaced to trace an inverted V belt path. The vertex portion of the belt path is positioned substantially halfway between the first and second side openings of the hopper and is preferably directly beneath the center portion of the chute. The pulleys are provided with an auxiliary endless conveyor belt which is rollably mounted thereon. The auxiliary conveyor belt follows the inverted V path as traced by the pulleys and establishes two oppositely, outwardly and downwardly inclined material carrying surfaces. The pulleys which securely receive the auxiliary conveyor belt may be selectively rotated under the influence of the falling material to roll the auxiliary conveyor belt either clockwise or counterclockwise dependent on which surface the material strikes and this is determined by the position of the gate mechanism next to be described.

The chute is further provided with a pair of parallel and spaced apart shafts which are pivotally mounted therein and which integrally receive a pair of parallel and substantially rectangular gates which extend downwardly into the hopper. The gates and their respective pivoting shafts are energized by means of linkages which connect to a pair of hydraulic cylinders which are pivotally mounted on opposing external surfaces of the walls comprising the hopper. When selectively moved into position by means of the linkages and the hydraulic cylinders, each gate is adapted to form a substantial continuation of one of the surfaces of the auxiliary belt. Continuing to use earth handling as an example, the system has two earth moving positions which are mirror images of each other; in each position, a selected gate forms substantially a continuation of one of the auxiliary conveyor belt surfaces while the other gate is substantially parallel to such surface. It can be seen that earth material entering the chute may be directed along either of the exposed surfaces of the auxiliary conveyor belt by selectively moving a gate to form an extension of the selected surface and by simultaneously moving the other gate into a position which is substantially parallel with such selected surface.

A pulley of the conveyor system may be connected to a suitable reversible motor, such as electric or hydraulic motor, by any convenient means so as to aid the movement of the endless conveyor belt in either a clockwise or a counterclockwise direction. It should however be understood that the reversible motor may be eliminated for the pulleys may be mounted on near frictionless bearings and the weight of the material falling on the conveyor belt may be sufficient to move the belt in the selected direction and at high enough speed.

The invention is illustrated in connection with the accompanying drawings in which the figures are illustrative of the preferred embodiment of the invention.

A frame 10 includes a lower hopper portion 11 and an upper chute portion 12 which is mounted on hopper portion 11. Chute portion 12 is comprised of parallel support members 13 and 14, connecting member 15 and vertical support members 16, 17, 18 and 19. Vertical support members 16 and 17 are connected to and extend downwardly from parallel support member 13 and vertical support members 18 and 19 are secured to and extend downwardly from parallel support member 14. Chute portion 12 is enclosed on three sides by means of cover plates 20, 21 and 22 which are respectively mounted on vertical support members 16 and 17 and parallel support member 13, vertical support members 17 and 18 and connecting support member 15, and vertical support members 18 and 19 and parallel support member 14. Hopper portion 11 is comprised of parallel support members 25 and 26 and connecting member 27. Vertical support members 16 and 17 extend upwardly from and are integrally connected to parallel support member 25 and vertical support members 18 and 19 are integrally connected to and extend upwardly from parallel support member 26. Hopper portion 11 also includes vertical support members 28, 29 and 30 which are integrally connected to and extend downwardly in parallel alignment from parallel support member 25 and vertical support members 31, 32 and 33 which are integrally connected to and extend downwardly from parallel support member 26. To add rigidity to hopper 11, a horizontal frame member 34 is integrally connected to vertical support members 28, 29 and 30 and a horizontal frame member 35 which is parallel to horizontal frame member 34 is integrally connected to vertical frame members 31, 32 and 33. Hopper portion 11 is provided with wall surfaces 37 which is integrally joined to parallel support member 25, vertical support members 28, 29 and 30 and to horizontal frame member 34 and wall member 38 is integrally connected to parallel frame member 26, vertical support members 31, 32 and 33 and to horizontal frame member 35. Hopper portion 11 is also provided with a top wall portion 39 which is integrally connected to parallel support members 25 and 26 and connecting member 27 and which has a tapered portion 40 extending upwardly to integrally connect with wall portion 21.

Frame 10 is connected to a belt loading elevator conveyor 50 by means of flanges 51 and 52 which integrally extend upwardly from vertical support members 30 and 33, respectively, and which are detachably secured to elevator conveyor 50 by a nut and bolt arrangement 53. Elevator conveyor 50 which has a discharge pulley 54 and a conveyor belt 55 is adapted to extend into chute 11 so that earth or other material 56 may be guided into hopper portion 11 by means of chute portion 12.

Hopper portion 11 is provided with an auxiliary conveyor system 60 which follows an inverted V shaped belt path and which is adapted to receive the flow of earth material 56 falling from conveyor 55 of belt loading elevator conveyor 50. Auxiliary conveyor system 60 includes a shaft 61 which is rotatably mounted in the upper portions of vertical support members 29 and 32. Shaft 62 which is parallel to shaft 61 is rotatably mounted in the lower extremities of vertical support members 28 and 31 and shaft 63 which is oppositely positioned and parallel to shaft 62 is rotatably mounted in the lower extremities of vertical support members 30 and 33. Shaft 64 which is parallel to shafts 61, 62 and 63 is rotatably mounted in vertical support members 29 and 32 at a position which is vertically between shafts 62 and 63 and shaft 61. Shafts 61, 62, 63 and 64 respectively receive pulleys 65, 66, 67 and 68 which are rigidly mounted thereon.

Shaft 62 which has pulley 66 mounted thereon is slidably received by slots 70 and 71 which are vertically arranged in vertical support members 28 and 31, respectively. Shaft 62 is selectively secured in slots 70 and 71 by means of nuts 72 which are threadably received by the ends of shaft 62. It can be seen that pulley 66 is mounted in parallel with parallel support member 15. Shaft 61 and pulley 65 are substantially in the vertical plane bisecting vertical support members 18 and 19 and vertical support members 17 and 16. Shaft 64 which is rotatably mounted in vertical support members 29 and 32 is reversibly rotated by reversible electric motor 80 by means of a worm gear 81 and pinion gear 82 arrangement. Worm gear 81 is integrally connected to power shaft 84 of motor 80 and meshes with pinion gear 82 which is rigidly mounted on shaft 64. Motor 80 is mounted on a small stand 83 which is secured to parallel frame member 35. Motor 80 is adapted to rotate pinion 68 by means of shaft 64 in either a clockwise or a counterclockwise direction depending upon the manner in which it is energized. While an electric motor is described other reversible motors such as reversible hydraulic motors may be employed. Pulleys 65, 66, 67 and 68 are adapted to receive and contact on at least a portion of their peripheral surfaces an auxiliary endless conveyor belt 86. Once conveyor belt 86 is installed on pulleys 65, 66, 67 and 68, it may be tightened by moving shaft 62 vertically along slots 70 and 71 until the proper tension has been obtained whereupon bolts 72 are tightened. Pulleys 65, 66, 67 and 68 and conveyor belt 86 together trace an inverted V path 85 as shown in FIGURE 3 and may be described as having downwardly sloping surfaces 87 and 88 and a vertex portion 89 which includes the area substantially over pulley 65.

In order to guide and control the flow of earth or other material 56 falling from elevator conveyor belt 55 onto surfaces 87 or 88, the invention is provided with a pair of gates 90 and 91 which are integrally connected to shafts 92 and 93, respectively. Shaft 92 is pivotally mounted in and extends through vertical support members 17 and 18 and shaft 93 is pivotally mounted in and extends through vertical support members 16 and 19. The end of shaft 93 extending through vertical support member 16 is integrally connected to pivot arm 94 and the end extending through vertical support member 19 is integrally connected to pivot arm 95. Shaft 92 has its end which extends through vertical support member 17 connected to pivot arm 96 and the end which extends through vertical support member 18 connected to pivot arm 97. Pivot arms 95 and 97 are pivotally connected to the end of a T linkage 98 which has a downwardly extending integral arm 99. Pivot arms 96 and 94 are pivotally conected to the ends of T linkage 100 which has a downwardly extending arm 101. Arms 101 and 99 are respectively and pivotally connected to pistons 102 and 103 which are received by hydraulic cylinders 104 and 105, respectively. Hydraulic cylinders 104 and 105 are respectively and pivotally connected to vertical support members 30 and 33. Hydraulic cylinders 104 and 105 when energized are adapted to pivot gates 90 and 91 to direct the flow of earth material 56 down a selected surface of belt 86. The linkage as described maintains gates 90 and 91 in a substantially parallel relationship.

Pivot arm 97 is provided with an extension 106 which defines an elongated slot 107. The elongated slot 107 slidably receives a stake 108 which is integrally secured to lever arm 109. Lever arm 109 is pivotally mounted on a suitable reversing switch 110. Reversing switch 110 is electrically connected by means of wire 111 to motor 80 and is energized from a source (not shown) through wire 112.

In operation, earth material 56 may be directed down either surface 87 or 88 of belt 86 by selectively moving pistons 102 and 103. To move pistons 102 and 103 outwardly into the position as shown in FIGURE 1 from the recessed position as shown in FIGURES 3 and 4, pressurized fluid is supplied thereto by means of hydraulic lines 120 and 121. As the pressurized fluid flows into cylinders 104 and 105, pistons 102 and 103 are forced outwardly thus moving T linkages 98 and 100 outwardly and thereby pivoting gates 90 and 91 into a position whereby gate 91 substantially forms an extension of conveyor belt 86 which covers surface 87 of belt 86 with gate 90 being parallel to surface 87. With pistons 102 and 103 in that extended position, extension 106 of lever arm 97 closes the circuit in reversing switch 110 by slidably moving stake 108 of lever arm 109 whereby motor 80 is energized to rotate conveyor belt 86 in a counterclockwise direction. Therefore, earth material 56 which falls from conveyor belt 55 of elevator conveyor 50 is channelled onto conveyor belt 86 covering surface 87 of belt 86 by means of gate 91 and conveyor belt 86 moves in a counterclockwise direction to facilitate the exiting of earth material 56 through a side opening in frame 10 which is defined by vertical support members 28 and 31 and horizontal connecting member 27. To direct earth material 56 through the opening in frame 10 as defined by vertical support members 30 and 33, pistons 102 and 103 are withdrawn into cylinders 104 and 105 by supplying pressurized fluid through lines 122 123 respectively to cylinders 104 and 105. Pistons 102 and 103 by means of the T linkages and the pivoting arms shift gates 90 and 91 into a position whereby gate 90 forms an extension of and gate 91 is parallel to surface 87 of belt 86. Extension 106 then reverses the position of lever arm 109 thus reversing the direction of rotation of worm gear 81 and subsequently of positively driven pulley 68.

Many different embodiments of this invention may be made without departing from the scope and spirit thereof. Therefore, it is to be understood that the invention is not to be limited to the specific embodiment shown and described herein, except as defined in the appended claims.

What is claimed is:

1. In combination with a material loading belt conveyor having a material discharge end from which the material falls, discharge apparatus for receiving the falling material and selectively directing it in either two opposite, downwardly and outwardly angular directions, said apparatus comprising:

(a) frame and wall means secured to said conveyor at said discharge end and defining in a lower portion a hopper having top and opposite side openings and in an upper portion a chute mounted on and extending upwardly from said top opening of said hopper, said chute being in communication with said discharge end for directing said discharged material through said top opening into said hopper for discharge through said side openings;

(b) a reversible auxiliary conveyor system comprising a plurality of conveyor belt pulleys rotatably mounted and spaced in said hopper so as to trace an inverted V-like belt path centrally positioned between said hopper side openings and an endless auxiliary conveyor belt entrained on said pulleys and providing a pair of opposite, downwardly inclined and divergingly projecting flat material conveying surfaces corresponding to said path and disposed between and facing said hopper side openings, said auxiliary belt being adapted to move on said pulleys in both clockwise and counterclockwise directions and move said surfaces accordingly;

(c) a reversible motor connected to a selected pulley and adapted to move said auxiliary belt, selectively, in clockwise and counterclockwise directions;

(d) movable gate means adapted to alternately direct falling material to a selected one of said movable conveying surfaces comprising:

(1) a pair of laterally spaced and parallel gates pivotally mounted in said chute crosswise of and above said auxiliary belt and extending downwardly into said hopper, each gate being adapted to selectively form an extension of one of said surfaces;

(2) linkage means interconnecting said gates and adapted to pivot with and maintain said gates in substantially parallel planes;

(3) a hydraulically operated piston and cylinder arrangement having one end mounted on said frame and wall means and the other end connected to said linkage means, said piston and cylinder arrangement being adapted to move said gates by means of said linkage means from a position which directs the falling material onto one auxiliary belt conveying surface to a position which directs such material to the other auxiliary belt conveying surface; and (4) reversing switch means mounted on said frame and wall means and connected to control the direction of said reversible motor and thereby control the direction of movement of said auxiliary belt, said reversing means being connected to and controlled by said hydraulic cylinder arangement whereby upon the movement of said gates into a position of continuation and parallel alignment with a selected auxiliary belt surface such surface and said auxiliary conveyor belt are driven downwardly.

2. The combination of claim 1 wherein said motor is an electric motor and said reversing means comprises an electric reversing switch, said reversing switch being connected to said linkage and being controlled by said cylinder.

3. The combination of claim 2 wherein said linkage is comprised of two parallel and spaced arms integrally mounted respectively on and adapted to pivot with said pair of parallel gates, one of said arms having a slotted extension, and a horizontally extending connecting bar transversing said space between said parallel arms and having ends pivotally connected to the ends of said arms, said piston being operably connected to said connecting bar, said reversing switch having a laterally extending shaft extending through said slotted extension, the pivoting of the arm having said extension being effective to control the position of said reversing switch and thereby control the direction of movement of said belt.

4. The combination of claim 1 wherein said linkage is comprised of two parallel and spaced arms integrally mounted respectively on and adapted to pivot with said pair of parallel gates and a horizontally extending connecting bar transversing said space between said parallel arms and having ends pivotally connected to ends of said arms.

References Cited

UNITED STATES PATENTS 1,273,206  7/1918  Waterhouse _____ 198—67

FOREIGN PATENTS 159,032  6/1940  Germany.
740,716  10/1943  Germany.

EVON C. BLUNK, *Primary Examiner.*

RICHARD E. AEGERTER, *Examiner.*